United States Patent
Kodama

[19]

[11] Patent Number: 6,083,042
[45] Date of Patent: *Jul. 4, 2000

[54] ADJUSTABLE CONNECTING DEVICE

[75] Inventor: Shinji Kodama, Shizuoka, Japan

[73] Assignee: Yazaki Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/073,937

[22] Filed: May 7, 1998

[30] Foreign Application Priority Data

May 9, 1997 [JP] Japan ..................................... 9-119428

[51] Int. Cl.$^7$ ..................................... H01R 13/66
[52] U.S. Cl. .......................................... 439/567; 439/571
[58] Field of Search .................................. 439/567, 571, 439/572, 562, 563, 564, 565, 566, 573, 574, 544, 548, 549, 552, 553, 556, 559, 555, 557

[56] References Cited

U.S. PATENT DOCUMENTS

| | | | |
|---|---|---|---|
| 5,254,014 | 10/1993 | Yagi et al. | 439/353 |
| 5,330,366 | 7/1994 | Tsuji et al. | 439/352 |
| 5,545,061 | 8/1996 | Sawayanagi | 439/752 |
| 5,711,630 | 1/1998 | Kodama | 403/329 |
| 5,788,522 | 8/1998 | Kameyama | 439/248 |
| 5,836,787 | 11/1998 | Kodama | 439/567 |

FOREIGN PATENT DOCUMENTS

| | | |
|---|---|---|
| 2-12784 | 1/1990 | Japan . |
| 5-54934 | 3/1993 | Japan . |
| 5-61908 | 8/1993 | Japan . |

*Primary Examiner*—Paula Bradley
*Assistant Examiner*—Ross Gushi
*Attorney, Agent, or Firm*—Armstrong, Westerman, Hattori, McLeland & Naughton

[57] ABSTRACT

An adjustable connecting device is provided. This adjustable connecting device has elastic support members formed on the support pillar of the frame. Such elastic support members are engaged with openings formed in an instrument panel or the like. Each of the elastic support members is made up of a first arm and a second arm which are integrally formed. The front end of each first arm is linked to the support pillar, while the rear end of each second arm is linked to the support pillar. Protection walls which are integral with the support pillar are situated on both sides of each second arm. A thin portion extending from the rear end of each second arm is situated inside a plane on which the adjacent protection walls are situated. With this adjustable connecting device, deformation of elastic support members can be prevented, and reliability in attaching the adjustable connecting device to a panel can be improved.

3 Claims, 4 Drawing Sheets

ADJUSTABLE CONNECTING DEVICE

BACKGROUND OF THE INVENTION

1. Field of the Invention

The present invention relates to an adjustable connecting device which has elastic support members to be engaged with an instrument panel for vehicles, and which is drawn to and engaged with a fixed connecting unit, such as a meter unit, by tightening a bolt.

2. Related Art

FIGS. 5 and 6 show a conventional adjustable connecting device.

This adjustable connecting device 31 is provided with a cylinder-like support pillar 33 in the center of a frame 32 made of a synthetic resin. The adjustable connecting device 31 also has four elastic support arms 34 protruding rearward from the mid section of the support pillar 33. A nut 35 (shown in FIG. 6) is fixed inside the support pillar 33. The elastic support arms 34 protrude rearward from openings 36 formed around the support pillar 33. Each elastic support arm 34 is provided with a locking protrusion 37 at the top.

Each locking protrusion 37 is engaged with the corresponding opening 39 formed in an instrument panel 38, as shown in FIG. 6. Contact springs 40 (shown in FIG. 5) are provided on both sides of each elastic support arm 34. The instrument panel 38 is interposed between the locking protrusions 37 and springs 40. The frame 32 is supported by the elastic support arms 34 such that it is movable in the vertical and transverse directions.

Rectangular protection walls 41 are formed on the base portion of the support pillar 33. Escape grooves 42 for accommodating the edges of the elastic support arms 34 are provided on both sides of each protection wall 41. Connector attachment openings 43 are formed at both ends of the frame 32. Arms 44 are formed inside each connector attachment opening 43, and the connector 45 is attached to the panel and held by the arms 44, as shown in FIG. 6.

With the connector 45 being attached to the frame 32, the elastic support arms 34 are engaged with the openings 39 of the instrument panel 38. The wires (not shown) from the connector 45 are guided along groove portions 46 of the instrument panel 38. The bolt of a mating fixed connecting unit (not shown), such as a meter unit for vehicles, is screwed into the nut 35 inside the support pillar 33, thereby releasing the elastic support arms 34 from the openings 39 and drawing the connecting unit 31 toward the mating fixed connecting unit. Thus, the connectors of both connecting units can be connected to each other. The elastic support arms 34 eliminate displacement between the connector units, enabling smooth and reliable engagement operations.

With the above prior art, however, there has been a problem that the elastic support arms 34 are liable to bend inward due to the heat generated at the time of resin-molding of the frame 32, as shown in FIG. 7. In such condition, the elastic support arms 34 will not exhibit enough holding power for the instrument panel 38, and the connecting unit 31 will easily come off the instrument panel 38. As shown in FIG. 8, wires 47 enter into the gaps between the elastic support arms 34 and the protection walls 41. As a result, the elastic support arms 34 are liable to be pulled outward and deformed, making it difficult to engage the elastic support arms 34 with the instrument panel 38.

SUMMARY OF THE INVENTION

The principal object of the present invention is to provide an adjustable connecting device which can be surely secured to a panel without causing deformation of elastic support members at the time of resin molding or in production procedures.

To achieve the above object, the present invention provides an adjustable connecting device having elastic support members formed on the support pillar of the frame. Each of the elastic support members is made up of a first arm and a second arm which are integrally formed. The front end of the first arm is linked to the support pillar, while the rear end of the second arm is linked to the support pillar. On both sides of each second arm, protection walls which are integral with the support pillar are provided. The portion extending from the rear end of each second arm is situated inside a plane on which the protection walls are situated.

In one aspect of the present invention, the first arms are supported by the respective second arms at the time of resin molding, so as to prevent them from bending inward and being deformed. In such condition, the elastic support members exhibit desirable holding abilities, and the adjustable connecting device can be prevented from coming off the panel.

In accordance with another aspect of the present invention, no gaps will be formed between the support pillar and the elastic support members. Since the elastic support members will not catch wires or the like in such condition, the elastic support members can be prevented from bending outward and being deformed. Thus, the elastic support members can be surely engaged with the panel.

The above and other objects and features of the present invention will be more apparent from the following description taken in conjunction with the accompanying drawings.

BRIEF DESCRITION OF THE DRAWINGS

DETAILED DESCRIPTION OF THE PREFERRED EMBODIMENTS

The following is a detailed description of embodiments of the present invention with reference to the accompanying drawings.

FIGS. 1 to 4 show one embodiment of the adjustable connecting device according to the present invention.

The adjustable connecting device 1 is characterized by comprising elastic support members 4 formed on all four sides of a cylinder-like support pillar 3 in a frame 2 made of a synthetic resin.

Figure 2:
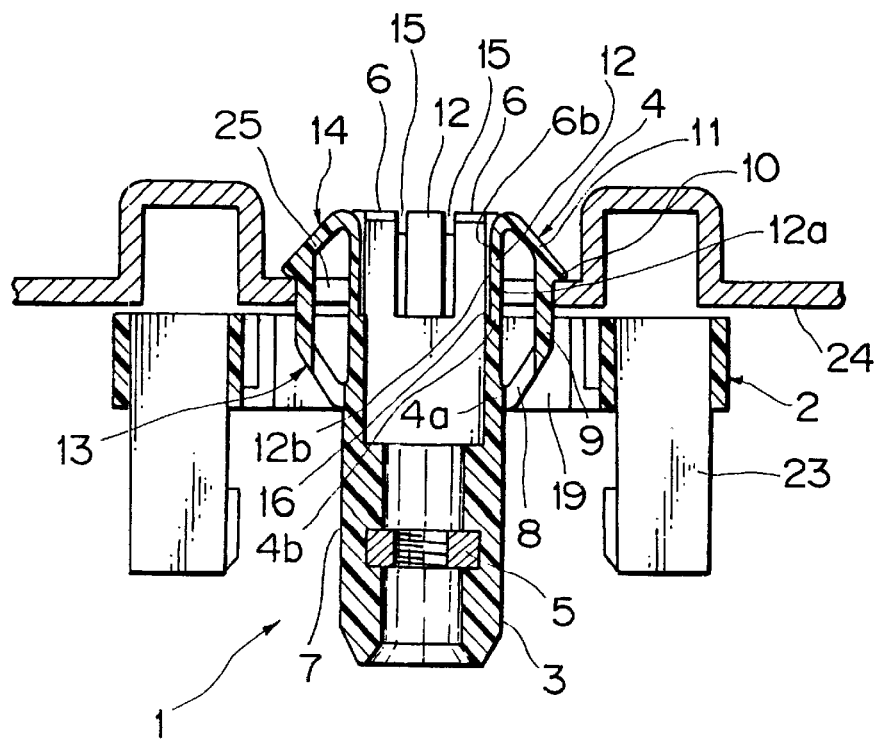
FIG. 2 is a transverse sectional view of the adjustable connecting device attached to a panel.

The support pillar 3 is provided with a nut 5 in the front as in the prior art. The rear half of the support pillar 3 is made thinner than the front half, and provided with protection walls 6 adjacent to the elastic support members 4. As shown in FIG. 2, the front half of each of the elastic support members 4 is situated in an insertion opening 19 of the frame 2, while the rear half of each of the elastic support members 4 protrudes rearward from the insertion opening 19.

The front end 4a of each of the elastic support members 4 is linked to the mid section of the outer wall 7 of the support pillar 3. An inclined portion 8 in the front half of each elastic support member 4 protrudes from the outer wall 7, and such inclined portion 8 extends to a straight portion 9 which is in parallel with the support pillar 3. The rear end of such straight portion 9 is provided with an outward locking protrusion 10 which extends to an inclined portion 11 on the rear side. Such inclined portion 11 leads to a flexible thin portion 12 which is integral with the support pillar 3. The rear end 4b of each elastic support member 4 is linked to the support pillar 3 on the rear side of the front end 4a.

A first arm 13 is made up of the inclined portion 8 in the front, the straight portion 9, and the locking protrusion 10, while a second arm 14 is made up of the inclined portion 11 in the rear and the thin portion 12. Such first arm 13 and second arm 14 are integrally formed and constitute a looped trapezoidal elastic support member 4. The embodiment of the present invention differs from the prior art in that the inclined portion 11 on the rear side is linked to the thin portion 12 which is integral with the support pillar 3, thereby constituting the second arm 14. The first arm 13 is supported by the supported pillar 3 via the second arm 14. Thus, the first arm 13 can be prevented from bending inward and being deformed.

The thin portion 12 is formed by cutting a pair of slits in the middle of each wall (outer wall) 7 on all four sides of the rear half of the support pillar 3. Two thick protection walls 6 are situated on both sides of each thin portion 12, which extends along the protection walls 6 to the mid section of the straight portion 9. Each protection wall 6 is bent at an angle of 90°, and separated from the adjacent thin portions 12 by the slits 15.

The outer surface 12a of each thin portion 12 is situated on a plane on which the adjacent walls 7, that is, the outer surfaces 6a of the adjacent protection walls 6 (see FIG. 4) are situated. The inner surface 12b of each thin portion 12 is situated outside a plane on which the adjacent walls 7, that is, the inner surfaces 6b of the adjacent protection walls 6 are situated, and leads to the adjacent walls 7 via a stage portion 16. The inner surface 12b of each thin portion 12 leading to the rear end of the corresponding elastic support member is situated inside the plane on which the outer surfaces 6a of the adjacent protection walls 6 are situated, and it is situated outside the plane on which the inner surfaces 6b of the adjacent protection walls 6. In short, each thin portion 12 is situated inside the adjacent protection walls 6 in the thickness direction, that is, within the formation range L (shown in FIG. 4) of the protection walls 6.

Figure 6:
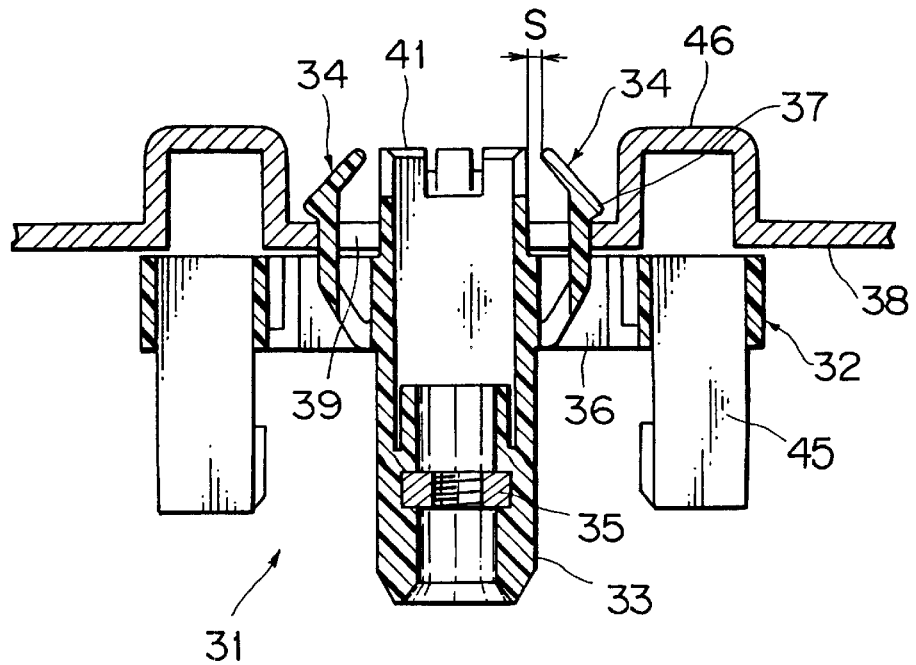
FIG. 6 is a transverse sectional view of the adjustable connecting device of the prior art attached to a panel.
Figure 7:
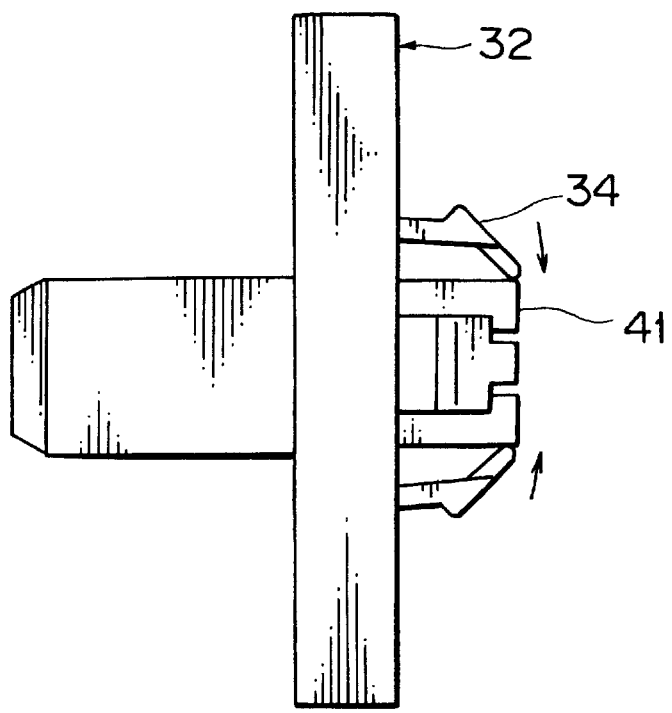
FIG. 7 is a schematic plan view illustrating a problem with the adjustable connecting device of the prior art.
Figure 8:
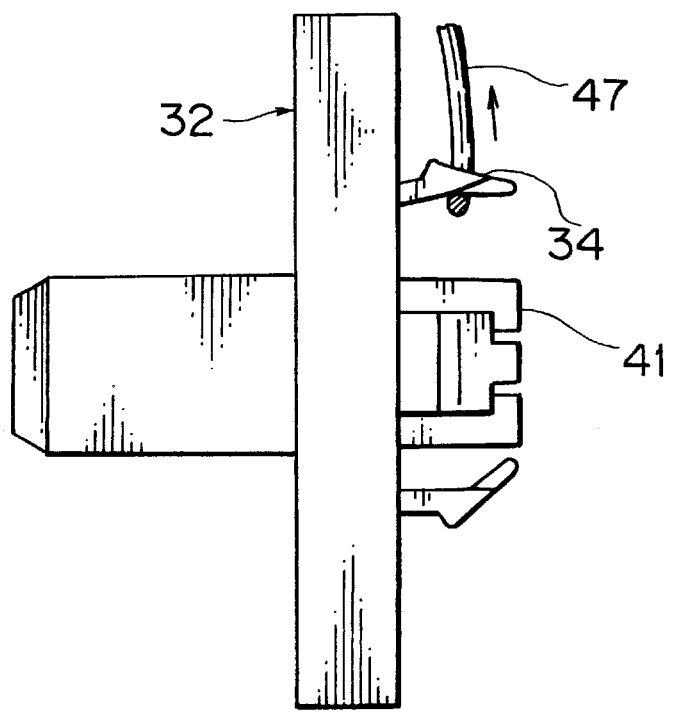
FIG. 8 is a schematic plan view illustrating another problem with the adjustable connecting device of the prior art.

In this manner, the gap S (shown in FIG. 6) between the elastic support members and the protection walls of the prior art can be eliminated. Each protection wall 6 is as tall as each thin portion 12, that is, each protection wall 6 has a height equal to the height of the protruding portion of each elastic support member 4. Thus, wires protected by the protection walls 6 will not be caught on the elastic support members 4.

Figure 3:
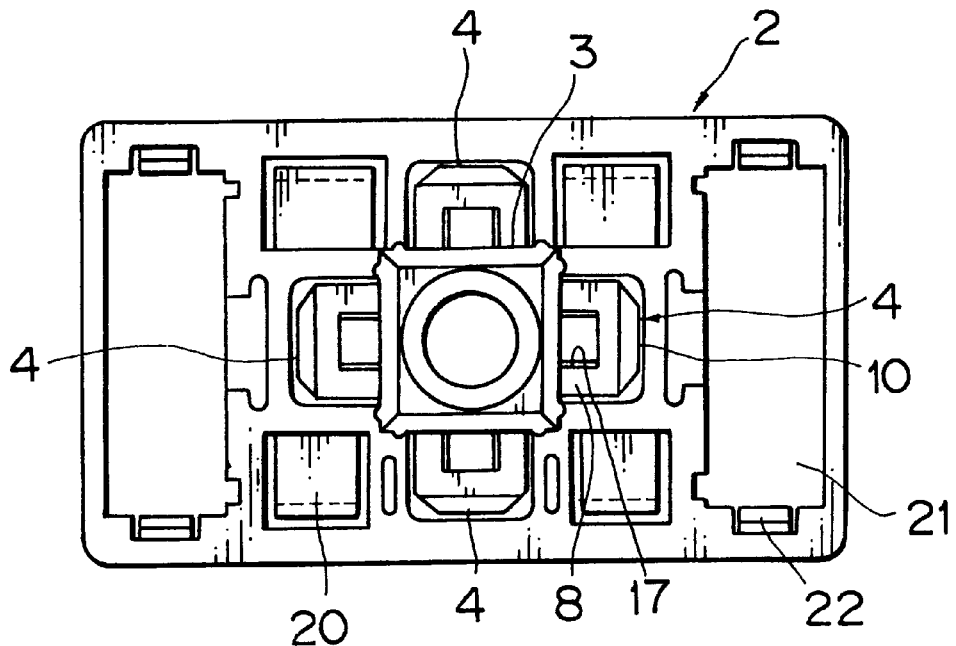
FIG. 3 is a front view of the adjustable connecting device.
Figure 4:
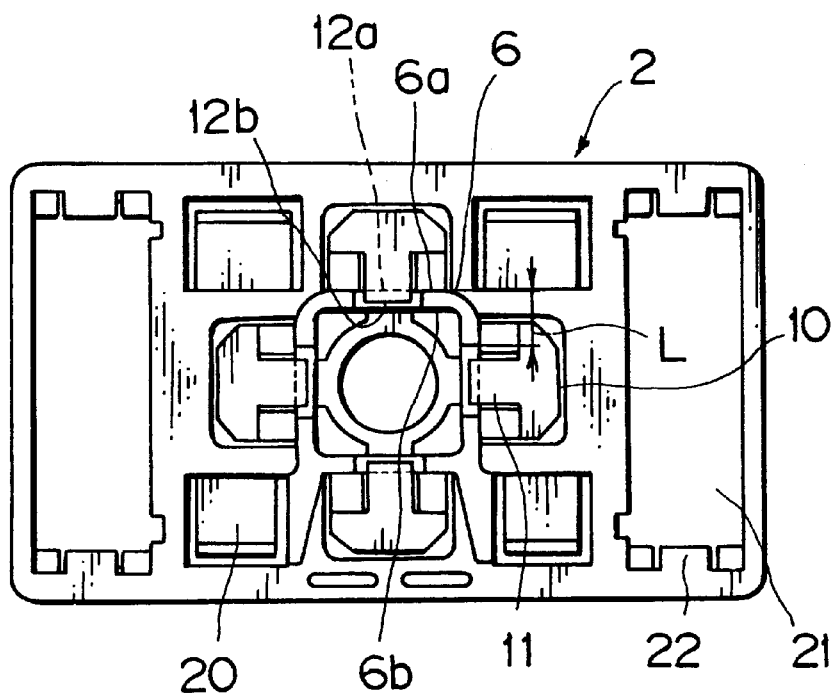
FIG. 4 is a rear view of the adjustable connecting device.
Figure 5:
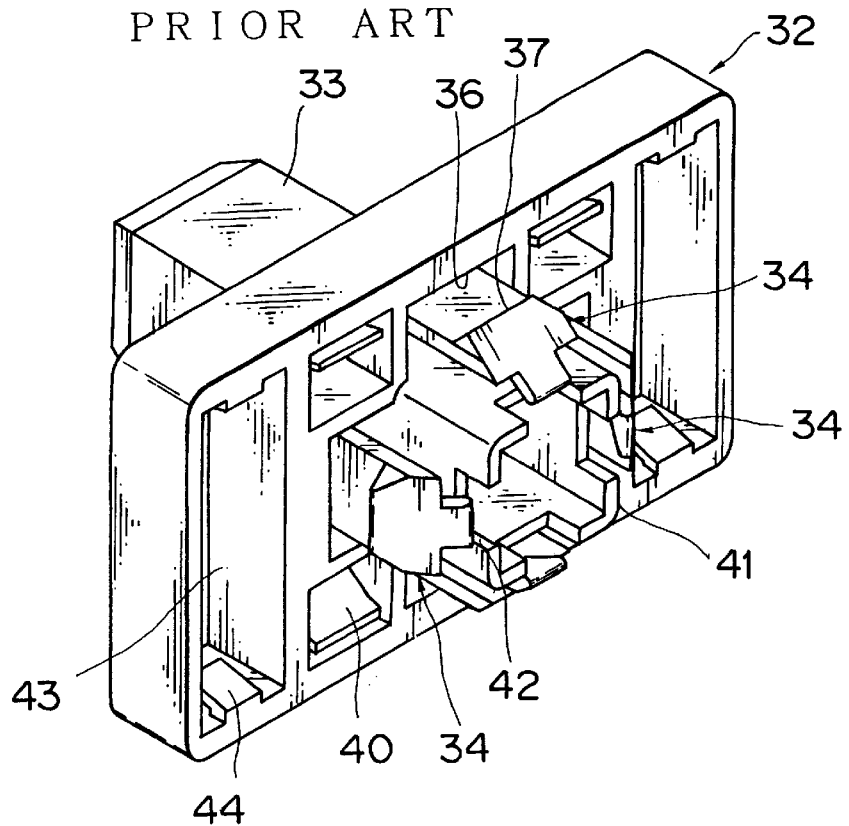
FIG. 5 is a perspective view of an adjustable connecting device of the prior art attached to a panel.

As shown in FIG. 3, the inclined portion a in the front of each elastic support member 4 has an opening 17, and the inclined portion 11 in the rear is formed over the opening 17. As shown in FIG. 4, each inclined portion 11 in the rear has the same width as each opening 17. Each straight portion 9 extending from the inclined portion 8 in the front and each locking protrusion 10 are wider than each inclined portion 11 in the rear. Each inclined portion 8 in the front is made narrower by the opening 17 so as to have enough flexibility.

Figure 1:
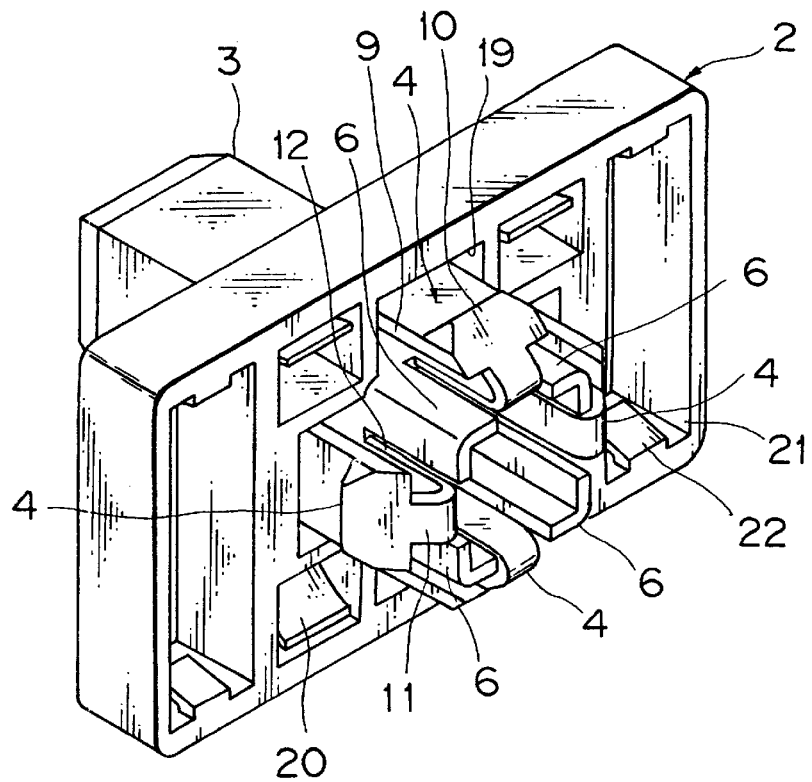
FIG. 1 is a perspective view of one embodiment of an adjustable connecting device in accordance with the present invention.

In FIG. 1, a contact spring 20 to be in contact with the panel 24 (shown in FIG. 2) is provided on both sides of each elastic support member 4. Connector attachment openings 21 are provided at both side ends of the frame 2, as in the prior art. An arm 22 for holding the connector is provided in each of the connector attachment openings 21.

As shown in FIG. 2, a connector 23 is attached to the frame 2, and the inclined portions 11 of the elastic support members 4 of the frame 2 are inserted into openings 25 of the panel 24. Each second arm 14 bends inward in the thin portion 12, and the straight portion 9 of the corresponding first arm 13 is also inclined inward, so that the corresponding locking protrusion 10 can be smoothly engaged with the corresponding opening 25. The panel 24 is interposed between the locking protrusions 10 and the contact springs 20 (shown in FIG. 1), such that the adjustable connecting device 1 can be held by the panel 24.

By tightening the bolt of a mating fixed connecting unit (not shown) to the nut 5, the adjustable connecting device 1 is drawn to and then engaged with the fixed connecting unit. Here, each elastic support member 4 bends inward in the thin portion 12, and the corresponding straight portion 9 is also inclined inward, so that the corresponding locking protrusion 10 can be smoothly disengaged from the opening 25. As described so far, the adjustable connecting device 1 is surely and smoothly attached to and removed from the panel 24 by virtue of the flexibility of the second arms 14.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An adjustable connecting device, comprising:

a frame having a support pillar disposed in a center portion thereof, elastic support members formed on the support pillar to be engaged with openings in a panel, each of the elastic support members comprising a first arm a front end of which is linked to the support pillar, and a second arm a rear end of which is linked to the support pillar and a front end of which is linked to the corresponding first arm; and protection walls which are integral with the support pillar and provided on both sides of each second arm, wherein each of the second arm has a thin portion extending from a rear end thereof and an outer surface of the thin portion of each second arm is disposed on a plane on which outer surfaces of the protection walls are disposed while an inner surface of the thin portion of each second arms is disposed outside a plane on which inner surfaces of the protection walls are disposed.

2. The adjustable connecting device according to claim 1, wherein each first arm comprises a first inclined portion, a straight portion, and a locking protrusion, and each second arm comprises a second inclined portion extending to the locking protrusion and the thin portion which is integral with the support pillar.

3. The adjustable connecting device according to claim 2, wherein each thin portion is formed by cutting a pair of slits in a center of each outer wall of a front half of the support pillar, and the protection walls are situated on both sides of each thin portion.

* * * * *